Patented June 29, 1937

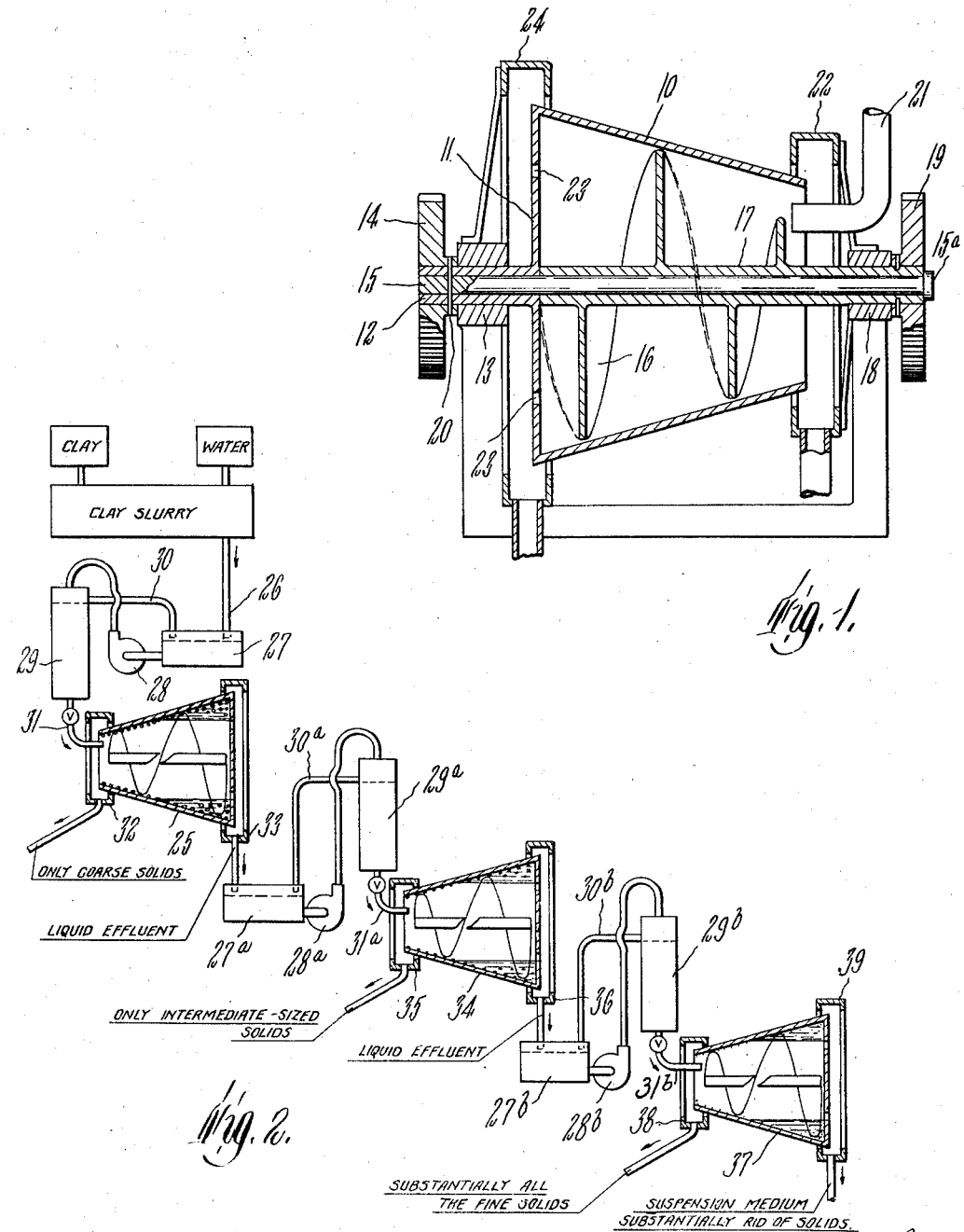

2,085,538

UNITED STATES PATENT OFFICE 2,085,538

RESOLUTION OF SUSPENSIONS OF FINELY DIVIDED SOLIDS INTO SUBSTANTIALLY UNIFORM SOLIDS FRACTIONS OF VARYING AVERAGE PARTICLE SIZE

Sanford C. Lyons, Bennington, Vt., assignor to Bird Machine Co., Walpole, Mass., a corporation of Massachusetts Application July 10, 1936, Serial No. 89,886

9 Claims. (Cl. 233—18)

This invention relates to the resolution of liquid suspensions of finely divided solids into separate substantially uniform solids fractions or grades of different average particle size or particle size range.

There are many suspensions of finely divided solids that are made up of fine particles of widely variant sizes, ranging, for example, all the way from particles that exhibit the Brownian movement, that is, from colloidal particle size, to particles that are visible to the naked eye and tend to settle out differentially when the suspension is permitted to stand in quiescent condition. Clay slurries, such as suspensions of china clay in water, are typical in these respects. Accordingly, although I shall deal hereinafter specifically in terms of resolving aqueous slurries or suspensions of clay into separate substantially uniform solids fractions of varying average particle size, since my invention may be applied to especially good advantage thereto, it should be understood that the principles of my invention extend to slurries or suspensions of barium sulphate, calcium carbonate, fillers and pigments of all sorts, and other solids of finely divided character that may be put to uses wherein the element of particle size is of significance or importance.

In accordance with the preferred embodiment of the present invention, a liquid suspension of finely divided solids made up of particles of various sizes is put through repeated centrifugation under progressively intensified solids-depositing conditions as suspension proceeds from one centrifugating stage or operation to the next, but under substantitally uniform solids-depositing conditions in each stage. Each of the solids fractions and the liquid suspending vehicle are separately and progressively removed from the sphere of action of each of the centrifugating stages and suspending liquid vehicle and suspended solids issuing from one centrifugating stage is subjected to the next stage of centrifugation at substantially constant rate of flow through each centrifuge. By virtue of the fact that there is progressive and substantially constant rate of flow of suspension through each centrifuge of the succession and substantially no static condition or material accumulation of suspending liquid vehicle or solids in any centrifugating stage, it is seen that substantial constancy of conditions prevails in each centrifugating stage and that one realizes a removal from suspension of separate solids fractions of substantially uniform average particle size or particle size range in each centrifugating stage but of progressively increasing average fineness as suspension proceeds from one centrifugating stage to the next.

As is well known, the rate of separation or deposition of solids of given average fineness or particle size range from liquid suspension in a centrifugal separator depends largely upon such factors as the effective diameter of the centrifuge bowl and the rate of rotation of the bowl. However, I have found that when solids in suspension are being resolved into fractions of different particle size by feeding the suspension through a succession of centrifuges, that is, are being centrifugally fractionated by the method hereof, it is necessary to ensure substantial constancy of rate of feed or flow of suspension through each of the centrifuges in order to ensure the emergence or recovery from each of the contrifuges of a fraction of the desired uniformly average particle size or of the desired substantially uniform particle size range. In the case of clay and other liquid suspensions, wherein the various particle sizes do not usually bear a constant ratio to each other as suspension is being progressively formed and delivered at a substantially constant rate of flow into the first centrifuge of the succession, it becomes necessary to the successful practice of the method hereof to provide in advance of the intake of each centrifuge suitable means for maintaining substantially constant the feed or rate of flow of suspension into each centrifuge irrespective of such variations in particle size or proportionality of the various particle sizes as may occur in the suspension being delivered into the first centrifuge of the succession. By choosing the appropriate factors of operation for the successive stages of centrifugation performed in accordance with my invention, including substantially constancy of rate of suspension flow through each centrifuge of the succession, it becomes possible to resolve such suspensions of finely divided solids of widely varying particle size into separate substantially uniform solids fractions or grades of varying average particle size, each fraction or grade being of substantially uniform average particle size or uniform particle size range and being adapted to fulfill to best advantage a particular sphere of use. Thus, china clay suspensions may thus be classified or graded into three or more solids fractions, the coarse fraction, including impurities, such as sand and mica, being useful in the manufacture of ceramic products, the second or intermediate fraction being clay such as is highly serviceable for filling or loading the body of book or other papers, and the finest fraction being made up of the smallest clay particles and hence being especially valuable in the coating of printing papers or other papers requiring an extremely smooth or polished surface. In some instances, the fractionating method hereof as applied to crude clay may be performed with a removal of coarse impurities, such as sand, mica, and the like, from the crude clay suspension by other than centrifugation, for instance, by passing the crude clay suspension through the sluices, classifiers, screens, or equivalent instrumentalities well known to those skilled in the art.

I have already indicated that the proportions of the different sized particles may vary in the suspension as it is progressively being formed and being subjected to the centrifugal fractionating method hereof, in consequence of which and in the absence of flow-regulation for each centrifuge, even though suspension may be fed at substantially uniform rate and at substantially uniform solids content into the first centrifuge and each of the centrifuges may be operated under substantially uniform centrifugal force, the solids fractions removed from each centrifuge may vary considerably in amount and particle size and so, too, the volume of effluent or suspension of depleted solids content delivered from each centrifuge. Indeed, in the case of clay suspensions or slurries, such variation in the proportionality of the different particle sizes in the raw clay may be so great that the amount of solids fraction recovered from a particular centrifuge may vary as much as 25% in the progressive conduct of the method hereof; and this variation may be even greater if clay suspension is prepared from widely segregated regions of a clay quarry. I have found that a most important factor affecting the quality or particle size of the solids fractions separated from suspension by the method hereof is the detention period of the suspension in each centrifuge, that is, the time that the suspension remains in the sphere of action of each centrifuge. The reason for this will appear when the law governing the rate of fall of bodies under a uniform acceleration is considered. This law is sometimes expressed by the equation, $$S = \tfrac{1}{2} a t^2$$

wherein S represents distance, $a$ represents rate of acceleration, and $t$ represents time. Consideration of this law shows that whereas, on the one hand, distance is directly proportional to acceleration, on the other hand, it varies as the square of time. It is thus seen that the rate of flow of clay slurry or other suspension through a centrifuge, which corresponds to the detention period of the suspension in the centrifuge, that is, is the factor $t$ in the equation, more profoundly affects the distance to which a given particle falls or subsides than does variation in the centrifugal force exerted by the centrifuge, which force corresponds to the factor $a$ in the equation. Since the differential falling or subsidence of the variously sized particles contained in the original suspension determines the particle size of the fractions that are separated or recovered in the successive centrifugal stages of the method hereof, unless the rate of feed or detention period of the suspension in each centrifugating stage is maintained substantially constant despite variations occurring in the proportions of the different sized particles in the original suspension, the desired control or constancy of particle size in the fractions being deposited and separated in each of the centrifuges cannot be had. In other words, although the centrifugal force in each centrifuging stage is controlled or maintained constant and although there may be a very decided difference in the centrifugal force created in the successive centrifuging stages so as to cause the separation of solids fractions of the desired different but substantially uniform average particle size in the various stages, nevertheless, the rate of flow of suspension through each of the centrifugal stages, which controls the period of detention of the suspension within each centrifuge, influences so decidedly the size of particles being separated in each centrifugating stage that it becomes possible by controlling the rate of flow of suspension through each centrifuging stage to effect the desired particle size fractionation by the method hereof practically without modifying the centrifugal force from stage to stage, as will hereinafter appear.

With the foregoing and other features and objects in view, I shall now describe my invention in further detail with particular reference to the accompanying drawing, wherein,—

Figure 1 represents a section through a centrifuge of the general type employed in the practice of my invention.

Figure 2 illustrates diagrammatically and conventionally the method of my invention as it is practiced with a succession of such centrifuges.

As shown in Figure 1, the centrifugal bowl or drum 10 may be of frustro-conical shape and be open at its small diameter end and have a wall 11 at its large diameter end. The end-wall 11 is shown as including a trunnion 12 journaled for rotation in a bearing 13. The trunnion is shown projecting beyond the bearing and having a gear 14 affixed thereto, the gear being driven from a suitable source of power (not shown) to cause rotation of the centrifuge. Passing through the hollow of the trunnion and continuing axially through the centrifuge and beyond its open end is an arbor 15 which serves as the support for a helicoidal blade 16 secured to a hollow shaft 17 encompassing the arbor and freely rotatable thereon. The blade is of progressively diminishing radius toward the open end of the centrifuge and barely clears the internal wall of the centrifuge. Both the arbor 15 and the shaft 17 are shown passing through and beyond a bearing 18. A gear 19 may be fixed to the shaft 17 beyond the bearing 18 and be driven from a suitable source of power (not shown) to cause rotation of the blade 16. The arbor 15 may be fixed to the trunnion 12 and the gear 14 by a pin 20 and be enlarged at its opposite end to form a flange 15a in sliding engagement over the corresponding end of the shaft 17. Both the centrifuge 10 and the blade 16 are caused to rotate in the same direction, but the rate of rotation of the blade is greater than that of the centrifuge so as to cause the desired scraping, propulsion, and ejection of the solids centrifugally deposited on the internal wall of the centrifuge out through the open end of the centrifuge, as will hereinafter appear in greater detail. By reversing the direction of lead of the blade 16 from that shown in Figure 1 of the drawing, it is possible to effect the desired scraping, propulsion, and ejection of the centrifugally deposited solids out of the open end of the centrifuge by causing the blade to lag suitably behind the centrifuge in its rate of rotation.

The suspension or slurry is progressively introduced into the centrifuge by a pipe 21 whose discharge end is adjacent to the open end of the centrifuge. As the suspension is so being progressively introduced into the centrifuge, it is thrown by centrifugal force against the internal wall of the centrifuge, tending to form an annular pool of progessively diminishing depth toward the open end of the centrifuge. The centrifugal force at work on the suspended solids tends to throw out and deposit solids as a layer on the internal wall of the centrifuge; and, as they are so being deposited, they are scraped from the wall and propelled out through the open end of the centrifuge, whence they are thrown forcibly from the peripheral edge and may be caught or received in an annular trough or receiving gutter 22. The centrifugal force thus tends to keep the deposited solids in static condition on the centrifuge wall and to promote solids accumulation on the wall, but acting against and overcoming this force is the positive non-centrifugal propulsive force of the blade 16 that progessively ejects the solids and thus maintains the effective diameter or effective centrifugating force in the centrifuge substantially constant. The end wall 11 has an annular opening 23 therethrough through which the liquid suspending medium or effluent may progressively escape under centrifugal force and be caught or recovered in an annular trough or receiving gutter 24. The discharge opening 23 is sufficiently outwardly offset relative to the small diameter end of the centrifuge so that the inner face of the pool in the centrifuge is well within the open end of the centrifuge, in consequence of which suspension or liquid suspending vehicle does not tend to escape through the open end of the centrifuge.

In practicing the method hereof, a succession of centrifuges of the type just described are used in the treatment of a suspension of finely divided solids, for instance, a clay suspension, as illustrated in Figure 2. Thus, freshly quarried clay and water may be mixed to form a clay suspension or slurry of a solids content ranging from, say, about 5% to 40%. In general, suspensions falling at the lower end of such solids content range may be centrifugally fractionated by the method hereof with sharper definition of particle size between the solids fractions than can suspensions falling at the upper end of such solids content range, but the treatment of dilute suspensions gives rise to a larger power consumption and is accompanied by lower output of solids with given equipment. When working with concentrated clay suspensions, it is preferable to add to such suspensions deflocculating or dispersing agents, such as sodium silicate, which act to increase the fluidity of a suspension of given solids content and thus to promote sharper centrifugal fractionation. Depending upon the results sought, that is, the sharpness of definition to be realized between the solids fractions in terms of their average particle size or particle size range, the clay suspension being subjected to centrifugal particle size fractionation in accordance with the principles of the present invention may, as already stated, vary in its solids content from, say, about 5% to 40%.

As shown in Figure 2, a clay suspension or slurry of the appropriate solids content may be delivered from a pipe 26, by way of suitable instrumentalities for regulating rate of flow or feed, into the small diameter or intake end of a centrifuge 25 operated under conditions designed to rid the suspension of substantially all of its comparatively coarse impurities, such as sand and mica. The flow-regulating instrumentalities illustrated in the drawing include a storage tank 27 with which the pipe 26 communicates and from which the suspension is circulated by a pump 28 into a constant-level tank 29 at a rate such that suspension constantly flows from the tank 29 through a pipe 30 back to the tank 27. The suspension thus maintained at constant liquid head in the tank 29 is fed at substantially uniform rate by way of a valved pipe 31 into the centrifuge 25, the valve with which said pipe 31 is provided preferably being of a type or construction such that reduction of the effective flow-opening therein and attendant variation in the rate of flow of suspension therethrough does not occur on account of significant clogging by coarse or oversized impurities. The coarse solids fraction deposited on the wall of the centrifuge 25 may be discharged from the open end of the centrifuge into a recovery trough 32, whence it may be removed for such further treatment as may be required to condition it for sale. The liquid suspending vehicle or effluent of depleted solids content emerging from the large diameter end of the centrifuge 25 may be caught in a recovery trough 33 and fed at substantially uniform rate by way of flow-regulating instrumentalities 27a, 28a, 29a, 30a, and 31a, similar to those in advance of the first centrifuge 25, into the intake end of a second centrifuge 34 operated under conditions resulting in the recovery therefrom of a solids fraction of intermediate-sized clay solids in a receiving trough 35, whence such solids fraction may be removed for such further treatment as may be required to condition it for sale. The liquid suspension vehicle or effluent of depleted solids content emerging from the large diameter end of the centrifuge 34 may be recovered in a receiving trough 36 and be fed at substantially uniform rate by way of flow-regulating instrumentalities 27b, 28b, 29b, 30b, and 31b, similar to those in advance of the first two centrifuges, into the intake of a last-stage centrifuge 37 operated under conditions designed to remove from the liquid suspension vehicle substantially all of its solids, including most, if not practically all, of the clay solids of finest or colloidal particle size present therein. To this end, the centrifuge 37 is preferably one that combines the forces of centrifugation and electrophoresis in the deposition of solids from the liquid suspension vehicle on the internal wall on the centrifuge in the manner disclosed in my application Serial No. 744,759, filed September 20, 1934, now Patent No. 2,057,156, dated October 13, 1936. I do not, however, claim herein a centrifugal fractionating method involving specifically the use of an electrophoretic centrifuge as the last-stage centrifuge, as this forms part of the invention disclosed and claimed in my application Serial No. 2,369, filed January 18, 1935. As pointed out in that application, deposition of fine solids, including even the colloidal ones, from aqueous suspension may be greatly accelerated in a centrifuge by impressing the wall of the centrifuge during centrifugation with an electric charge tending to attract the solids, the wall of the centrifuge being electro-insulated from the rest of the machine which may receive the opposite electric charge necessary for closing the electrophoretic circuit. The last fraction of finest clay solids delivered by the centrifuge 37 may be recovered in a receiving trough 38, whence such solids fraction may be removed for such further treatment as may be required to condition it for sale. The liquid effluent from the centrifuge 37 may be caught in a recovery trough 39 and either be discarded or used as the suspending medium for other freshly quarried clay.

I shall now indicate the particular conditions under which I have practiced the method hereof upon clay slurries prepared from such crude clays as are quarried in Sandersville, Georgia. These clays were made up into aqueous suspension containing one part by weight of dry clay and two parts of water. The clay was thoroughly blunged so as to eliminate lumps and a suitable dispersing agent, namely, sodium silicate, was added to the resulting aqueous suspension in the amount of about ½ to 1%, based on the weight of clay, to promote deflocculation or dispersion of the clay as far as possible into fine particle size and also to increase the fluidity of the suspension. The slurry was passed into the first-stage centrifuge 25, which had a normal maximum internal diameter of 36" and a normal length of 50", at a constant rate of about 100 gallons per minute with the centrifuge being rotated at approximately 900 R. P. M. Under these conditions, practically all of the particles in the suspension coarser than about 10 microns and constituting about 25% of the weight of the original clay put into suspension were ejected from the first-stage centrifuge as a fairly stiff paste of about 65% solids content. The ejected solids fraction contained all of the grit or objectionable oversized foreign particles associated with the original clay as well as the coarse clay particles which can be and are occasionally recovered for use as lower grade clays. The effluent from the first-stage centrifuge containing the finer clay particles was passed at a constant rate of about 65 gallons per minute into the second-stage centrifuge 34, which was of the same size and construction as the first-stage centrifuge and was rotated at about the same rate of speed. The second-stage centrifuge ejected about 25% of the solids of the suspension that was being fed thereinto and the ejected solids fraction, which was also of pasty consistency and about 60% solids content, was found upon examination under the microscope to be of extraordinarily uniform particle size ranging from about 10 to 2 microns. The suspension or slurry of depleted solids content issuing from the second-stage centrifuge was fed at a constant rate of about 55 gallons per minute to the last-stage or electrophoretic centrifuge 37, which, other than being equipped with electrophoretic parts, was of the same size and construction as the first two centrifuges and was operated at the same rate of speed. The slurry passing through the last-stage or electrophoretic centrifuge was put under the influence of a direct current E. M. F. of about 180 volts, which developed a current of about 200 amperes. Under these conditions, the last-stage centrifuge delivered most of the fine and colloidal clay solids of the suspension fed thereinto as a very stiff paste, resembling stiff putty, containing clay particles of a size smaller than 2 microns. It is thus seen that all of the solids fractions producible by the method hereof are of comparatively high solids content and require comparatively little dewatering or drying for marketing. Indeed, they are of such high solids content as to be essentially non-fluent.

It is to be understood that the foregoing example is simply illustrative and is subject to considerable variation. Thus, the second-stage centrifuge may be operated with such flow of suspension therethrough and/or under such centrifugal force as to deliver a solids fraction ranging in particle size from, say, 10 to 7 microns. Again, it is possible to add one or more stages of centrifugation between the second and third stages of centrifugation hereinbefore described. Thus, two more stages of centrifugation might thus be interposed and the second stage controlled to yield a fraction of a particle size ranging from about 10 to 4 microns, the third stage controlled to yield a solids fraction of a particle size ranging from 4 to 2 microns, the fourth stage controlled to yield a fraction of a particle size ranging from 2 to 1 microns, and the fifth or last stage controlled to yield a fraction of a particle size finer than 1 micron.

The method hereof is not limited to the use of an electrophoretic centrifuge at the last stage, whether the last stage is the third, fourth, or later stage of a solids-fractionating system such as has hereinbefore been described. Thus, once the coarse impurities and coarse clay solids have been removed by centrifugation from a clay slurry, as hereinbefore described, the effluent suspension of depleted solids content from the previous centrifugating stages may be treated in any suitable or conventional way, for instance, with a suitable flocculating agent, such as alum, in amount sufficient to aggregate or flocculate the fine clay solids and thus permit separation of such solids by a conventional method, such as filtration. Thus, the effluent suspension of depleted solids content may be treated with alum in the amount of about 1%, based on the dry weight of solids, whereupon the flocculated fine clay solids may then be readily recovered from the suspension in filter presses such as are currently used in the clay industry.

Some clay and other solids suspensions are of such particle size and/or surface characteristics as to yield under the conditions of fractional centrifugation hereinbefore described a solids fraction of extraordinary sliminess even at high solids content, insomuch that the fraction tends to slide back or backtrack on the spiral screw or conveyor into the centrifuge and thus present difficulty in being ejected progressively as it is being deposited, that is, without material accumulation in the centrifuge. I have found that an electrophoretic centrifuge like that described in my application Serial No. 744,759, now Patent No. 2,057,156, may be advantageously employed in the centrifugating stage where such difficulty occurs, since by impressing only a moderate voltage, for example, 35 to 40 volts, across the electrophoretic surfaces, it is possible to increase markedly the stiffness and ejectability of an otherwise slimy and difficultly ejectable solids fraction. It is probably the case that this stiffening or consolidating effect on the solids is the result of the electrophoretic attraction of the solids to the centrifuge wall and/or the flocculation of the finer or colloidal solids otherwise responsible for sliminess. I am thus enabled to fractionate clays and other solids which cannot be fractionated as sharply or accurately as desired by purely centrfugal force.

The intermediate clay fraction or fractions produced by the method hereof, that is, clay products ranging in particle size from about 10 to 2 microns, are visibly quite different in character from the fine or last-stage fraction or fractions of a particle size finer than about 2 microns. I might, for instance, mention that the intermediate fractions are distinctly softer and more friable, which qualities bespeak their substantial freedom from extremely fine or colloidal particles. The intermediate clay fractions are particularly adapted for such purposes as making printed wall or other papers, in which latter use the clay serves together with dye or pigment and binders, such as casein and starch, in making the printing ink composition. Because of the particular particle size of these intermediate clay fractions, they are more intensely dyed or pigmented by a given amount of dye or pigment than the colloidal or finest clay particles; and they are free from the undesirably coarse particles. In other words, the colloidal or finest clay is less desirable in such composition because it unduly detracts from the tinctorial power of the comparatively much more expensive dye or pigment and, in some cases, tends to increase the viscosity of the composition objectionably.

The intermediate clay fractions produced by the method hereof are also more valuable then the usual clays as extenders or diluents for such comparatively expensive pigments as titanium dioxide. They are also particularly adapted in making cast or ceramic bodies. Thus, in making cast clay bodies, clay is sometimes put into the form of a very thick slurry, poured into a collapsible plaster of Paris mold of the desired shape, and, after some of the water of the slurry has been absorbed by the mold walls and a layer of clay deposited thereon, excess clay slurry is poured out of the mold, the deposited layer of moist clay allowed to dry, and the mold separated from the cast clay body. The intermediate clay fractions hereof are particularly adapted for such casting by reason of the fact that they yield clay slips of comparatively high fluidity at high solids content and give up or "drain" their water through the plaster of Paris molds comparatively rapidly so as to expedite the casting process. In these casting compositions, the clay is generally made up into a slip or slurry along with ground flint, which lends "body" to the cast article, and with feldspar, whose fusibility makes possible the impartation of higher integrity or resistance to fracture to the cast article by heat treatment or baking. The intermediate sized clay fractions hereof are also valuable in ceramic structures wherein the size of the particles and the cellular or void space created thereby are in significant measure determinative of the resistance of such structures to shattering and temperature shocks.

The fine clay fractions produced by the method hereof are particularly adapted for paper coatings of extremely high gloss and covering power, such as is desired in printing and book papers. Such fine clay fractions are also advantageously applicable for special uses in the ceramic industry, for instance, when it is desired to produce a ceramic composition containing clay of high bonding power without at the same time adding an appreciable amount of coarser and in a sense inert particles, as is now the case when using clays of conventional preparation, and when it is desired to produce nicely-finished ceramic ware. The fine or colloidal clay fractions are also of great value as fillers or reinforcing agents in rubber compounds and as dispersing agents, for instance, in making aqueous asphalt emulsions or the like.

By the practice of my invention, it is possible to realize a centrifugal particle size fractionation of solids of a particle size so fine that they cannot be graded or classified readily through the use of wire cloth screens, which, as is well known, are subject to serious disadvantages when used for the grading of finely divided solids. Thus, wire cloths of the finest mesh commercially available are not fine enough to retain thereon solids fractions such as I can recover readily by centrifugation in accordance with my invention. Moreover, wire cloths of extremely fine mesh tend to become fouled rapidly and thus to have low screening capacity, particularly since vigorous vibration, doctoring, or other expedients ordinarily adopted to maintain high screening capacity cannot be used therewith without incurring rapid failure thereof and the expense of frequent renewals thereof. It might be further noted that particle size fractionation of finely divided solids of a colloidal nature, such as clay, cannot be attained through differential settling of the solids in liquid suspension under normal settling conditions. Thus, although it is possible to settle out differentially comparatively coarse impurities, such as sand and mica, from dilute aqueous clay suspensions or slurries, the clay or kaolin component of the suspension cannot be separated into solids fractions of different average particle size or different particle size range through settling under normal settling conditions, since clay particles of all sizes tend to flocculate rather than to subside differentially. Under the influence of centrifugal force, clay particles do not tend to flocculate. On the contrary, such flocculated clay as may be present in the suspension tends to become deflocculated under the disruptive forces at play during centrifugation. It is possible to realize some differential settling of clay particles in suspension in the presence of deflocculating agents, but the difference in rates of settling of particles of different sizes is relatively so small that separation of the clay into solids fractions of sharply different average particle size or sharply different particle size range cannot be thus had. By employing centrifugal force as the agency for promoting the separation of clay particles from aqueous suspension, it is possible to accentuate vastly such different settling tendencies as exist between the particles of different sizes in the suspension and thus to throw out of suspension much more rapidly the clay particles of largest size while retaining in suspension the comparatively fine clay particles, which latter particles may, as hereinbefore stated, be separated out of suspension to best advantage and practically completely under combined centrifugal and electrophoretic forces.

It is possible to reverse the order or sequence of intensification of the solids-depositing conditions in the various stages of centrifugation from that hereinbefore described. Thus, rather than centrifugally separating from the suspension first a solids fraction of coarsest average particle size and proceeding to separate from the liquid effluent solids fractions of progressively increasing average fineness, it is possible to perform a first stage of centrifugation conducing to a liquid effluent containing suspended therein the solids fraction of finest average particle size and a solids fraction inclusive of all of the remaining or coarser solids. The segregated, suspended fraction of finest average particle size may be suitably recovered from the liquid effluent. The coarser solids fraction may be resuspended in water and subjected to a second stage of centrifugation at a lower intensity of solids-depositing conditions resulting in a liquid effluent containing suspended therein a segregated solids fraction of an average particle size somewhat coarser than the first or finest solids fraction and to a solids fraction of an average particle size distinctly coarser than the segregated solids fraction suspended in the second stage liquid effluent. The solids fraction segregated and suspended in the second stage liquid effluent may be suitably recovered therefrom. Resuspension of the coarser solids fraction in water and centrifugation may be repeated at a lower intensity of solids-depositing conditions as the practice already described repeated. Such order or sequence of particle size fractionation by centrifugation is considered to be equivalent to the preferred embodiment of invention hereinbefore described as involving more intensified solids-depositing conditions as the suspension of particles of various sizes proceeds from one centrifuge or centrifugating stage to the next.

It will, of course, be understood that the practice of my invention may be performed with any suitable number of stages of centrifugation and that, broadly stated, it involves subjecting a liquid suspension of finely divided solids made up of particles of various sizes into separate solids fractions of varying average particle size by repeated centrifugation under progressively varying solids-depositing conditions as suspension proceeds from one centrifugating stage to the next. It will be further understood that while my invention has been described as being performed with a number of separate centrifuges connected in series, it might be performed with a single centrifuge by running the suspension through the centrifuge while it is operating under one set or combination of solids-depositing conditions, collecting the liquid effluent discharged from the centrifuge, and re-running it through the same centrifuge under a different set or combination of solids-depositing conditions, with the result that with each run through the centrifuge a solids fraction of different average particle size may be recovered from the centrifuge. As already indicated, rather than relying upon an initial centrifugating stage for the elimination of coarse or oversized impurities from crude clay suspensions, it is possible and, indeed, it may be sometimes desirable, to substitute for the first-stage centrifuge, sluices, classifiers, screens, or equivalent instrumentalities designed to rid the crude clay suspension of its coarse or oversized impurities on its way to the first-stage of centrifugation or clay-fractionation.

The principles of the present invention hereinbefore described as applied to the centrifugal fractionation of clays may be extended to such other pigments or fillers as titanium dioxide, zinc oxide, zinc sulphide, lithopone, barium sulphate, calcium carbonate, etc., in connection with all of which it is frequently desirable that particle size, attendant tinctorial value, oil absorption, and other physical and chemical qualities be subject to control as in the case of clays. All of these finely divided materials whether found in nature or prepared by precipitation, sintering, quenching or other methods consist of particles of widely varying sizes; and by the method hereof it becomes possible to resolve them into uniform fractions or grades, each of which is of different average particle size or particle size range and has a specific and desirable sphere of utility. The method hereof is, as already indicated, far more effective in promoting the segregation of particles of different size than are ordinary gravitational separatory methods, particularly in case of suspensions of materials, like calcium carbonate, that may form comparatively viscous suspensions at the solids content at which it is most desirable for economic reasons to perform the fractionation or separation. Gravitational separation into different particle sized fractions is, moreover, at best very approximate and always slow, requiring large settling tanks and comparatively high dilution of suspension; and variation in fluidity of suspension under varying temperature and hydrogen ion concentration gives rise to material variations in the quality or particle size of a gravitationally settled solids fraction. Under the conditions of the centrifugal fractionating method hereof, such factors as variations in the temperature and hydrogen ion concentration of the suspension (as affecting the viscosity thereof), thixotropic effect, etc. are of relatively minor significance and do not appreciably affect the quality or particle size of the centrifugally separated solids fractions.

So far as concerns subject matter, this application is a continuation-in-part of my application Serial No. 756,954, filed December 11, 1934.

I claim:

1. A method of resolving a liquid suspension of finely divided solids made up of particles of various sizes into separate substantially uniform solids fractions of different particle size by the use of rotary centrifuges on whose internal walls such solids may be centrifugally deposited, which comprises subjecting such suspension to repeated centrifugation in such rotary centrifuges under progressively intensified solids-depositing conditions as suspension proceeds from one centrifugating stage to the next, maintaining the solids-depositing conditions, including the rate of rotation of the centrifuge and the rate of flow of suspension, substantially constant in each centrifugating stage, progressively removing during centrifugation each of the solids fractions from the internal wall of the centrifuge and separately removing liquid effluent from the sphere of action in each of the centrifugating stages so as to maintain the effective centrifugating force in each stage substantially constant, and subjecting liquid effluent from one centrifugating stage to the next, thereby effecting a removal from suspension of a substantially uniform solids fraction in each stage but of progressively increasing fineness as liquid effluent proceeds from one centrifugating stage to the next.

2. A method of resolving an aqueous clay suspension containing sand, mica, and other relatively coarse impurities into separate substantially uniform solids fractions of different particle size, which comprises subjecting such suspension to repeated centrifugation under progressively intensified solids-depositing conditions as suspension proceeds from one centrifugating stage to the next, maintaining the solids-depositing conditions, including the rate of flow of suspension, substantially constant in each stage, progressively removing during centrifugation each of the solids fractions and separately removing liquid effluent from the sphere of action of each of the centrifugating stages so as to maintain the effective centrifugating force in each stage substantially constant, subjecting liquid effluent from one centrifugating stage to the next, thereby effecting a removal from suspension of a substantially uniform solids fraction in each stage but of progressively increasing fineness as liquid effluent proceeds from one centrifugating stage to the next, and controlling the first centrifugation to remove from the suspension sand, mica, and other relatively coarse impurities.

3. A method of resolving an aqueous clay suspension into separate substantially uniform solids fractions of different particle size by the use of rotary centrifuges on whose internal walls such solids may be centrifugally deposited, which comprises subjecting such suspension to repeated centrifugation in such rotary centrifuges under progressively intensified solids-depositing conditions as suspension proceeds from one centrifugating stage to the next, maintaining the solids-depositing conditions, including the rate of rotation of the centrifuge and the rate of flow of suspension, substantially constant in each centrifugating stage, progressively removing during centrifugation each of the solids fractions from the internal wall of the centrifuge and separately removing liquid effluent from the sphere of action in each of the centrifugating stages so as to maintain the effective centrifugating force in each stage substantially constant, subjecting liquid effluent from one centrifugating stage to the next, thereby effecting a removal from suspension of a substantially uniform solids fraction in each stage but of progressively increasing fineness as liquid effluent proceeds from one centrifugating stage to the next, and performing the last centrifugation under solids-depositing conditions to remove from suspension most of the finest clay solids.

4. A method of resolving an aqueous clay suspension containing sand, mica, and other relatively coarse impurities into separate substantially uniform fractions of different particle size, which comprises subjecting such suspension to repeated centrifugation under progressively intensified solids-depositing conditions as suspension proceeds from one centrifugating stage to the next, maintaining the solids-depositing conditions, including the rate of flow of suspension, substantially constant in each stage, progressively removing during centrifugation each of the solids fractions and separately removing liquid effluent from the sphere of action of each of the centrifugating stages so as to maintain the effective centrifugating force in each stage substantially constant, subjecting liquid effluent from one centrifugating stage to the next, thereby effecting a removal from suspension of a substantially uniform solids fraction in each stage but of progressively increasing fineness as liquid effluent proceeds from one centrifugating stage to the next, and performing the first centrifugation under solids-depositing conditions to remove from suspension sand, mica, and other relatively coarse impurities and the last centrifugation under solids-depositing conditions to remove from suspension the finest solids fraction.

5. A method of resolving a liquid suspension of finely divided solids made up of particles of varying sizes into separate substantially uniform solids fractions of different particle size by the use of rotary centrifuges on whose internal walls such solids may be centrifugally deposited, which comprises subjecting such suspension to repeated centrifugation in such rotary centrifuges under progressively intensified solids-depositing conditions tending to deposit said solids as an essentially non-fluent layer on the internal wall of each centrifuge as suspension proceeds from one centrifugating stage to the next but under substantially uniform resultant solids-depositing conditions in each stage, said conditions in each stage including, however, centrifugal force tending to keep the deposited solids in static condition and to promote solids accumulation in each stage, maintaining the rate of rotation of the centrifuge and the rate of flow of suspension substantially constant in each centrifugating stage, progressively removing during centrifugation each of the solids fractions from the internal wall of each centrifuge, while maintaining it next to the wall in the course of removal in essentially non-fluent condition, under positive, non-centrifugal propulsive force acting against and overcoming said centrifugal force, separately progressively removing liquid effluent under centrifugal force from the sphere of action of each of the centrifugating stages so as to maintain the effective centrifugating force in each stage substantially constant, and subjecting liquid effluent from one centrifugating stage to retreatment in the next centrifugating stage, thereby effecting a removal from suspension of solids fractions of substantially uniform particle size in each stage but of progressively increasing fineness as liquid effluent proceeds from one centrifugating stage to the next.

6. A method of resolving an aqueous clay suspension containing sand, mica, and other relatively coarse impurities into separate substantially uniform solids fractions of different particle size by the use of centrifuges on whose internal walls such solids may be centrifugally deposited, which comprises subjecting such suspension to repeated centrifugation in such centrifuges under progressively intensified solids-depositing conditions tending to deposit said solids as an essentially non-fluent layer on the internal wall of each centrifuge as suspension proceeds from one centrifugating stage to the next but under substantially uniform resultant solids-depositing conditions in each stage, said conditions in each stage including, however, centrifugal force tending to keep the deposited solids in static condition and to promote solids accumulation in each stage, progressively removing during centrifugation each of the solids fractions from the internal wall of each centrifuge, while maintaining it next to the wall in the course of removal in essentially non-fluent condition, under positive, non-centrifugal propulsive force acting against and overcoming said centrifugal force, separately progressively removing liquid effluent under centrifugal force from the sphere of action of each of the centrifugating stages so as to maintain the effective centrifugating force in each stage substantially constant, subjecting liquid effluent from one centrifugating stage to retreatment in the next centrifugating stage, thereby effecting a removal from suspension of solids fractions of substantially uniform particle size in each stage but of progressively increasing fineness as liquid effluent proceeds from one centrifugating stage to the next, and controlling the first centrifugation to remove from the suspension sand, mica, and other relatively coarse impurities.

7. A method of resolving an aqueous clay suspension into separate substantially uniform solids fractions of different particle size by the use of rotary centrifuges on whose internal walls such solids may be centrifugally deposited, which comprises subjecting such suspension to repeated centrifugation in such rotary centrifuges under progressively intensified solids-depositing conditions tending to deposit said solids as an essentially non-fluent layer on the internal wall of each centrifuge as suspension proceeds from one centrifugating stage to the next but under substantially uniform resultant solids-depositing conditions in each stage, said conditions in each stage including, however, centrifugal force tending to keep the deposited solids in static condition and to promote solids accumulation in each stage, maintaining the rate of rotation of the centrifuge and the rate of flow of suspension substantially constant in each centrifugating stage, progressively removing during centrifugation each of the solids fractions from the internal wall of each centrifuge, while maintaining it next to the wall in the course of removal in essentially non-fluent condition, under positive, non-centrifugal propulsive force acting against and overcoming said centrifugal force, separately progressively removing liquid effluent under centrifugal force from the sphere of action of each of the centrifugating stages so as to maintain the effective centrifugating force in each stage substantially constant, subjecting liquid effluent from one centrifugating stage to retreatment in the next centrifugating stage, thereby effecting a removal from suspension of solids fractions of substantially uniform particle size in each stage but of progressively increasing fineness as liquid effluent proceeds from one centrifugating stage to the next, and performing the last centrifugation under conditions to remove from suspension the finest solids fraction.

8. A method of resolving an aqueous clay suspension containing sand, mica, and other relatively coarse impurities into solids fractions of varying average particle size by the use of centrifuges on whose internal walls such solids may be centrifugally deposited, which comprises subjecting such suspension to repeated centrifugation in such centrifuges under progressively intensified solids-depositing conditions tending to deposit said solids as an essentially non-fluent layer on the internal wall of each centrifuge as suspension proceeds from one centrifugating stage to the next but under substantially uniform resultant solids-depositing conditions in each stage, said conditions in each stage including, however, centrifugal force tending to keep the deposited solids in static condition and to promote solids accumulation in each stage, progressively removing during centrifugation each of the solids fractions from the internal wall of each centrifuge, while maintaining it next to the wall in the course of removal in essentially non-fluent condition, under positive, non-centrifugal propulsive force acting against and overcoming said centrifugal force, separately progressively removing liquid effluent under centrifugal force from the sphere of action of each of the centrifugating stages so as to maintain the effective centrifugating force in each stage substantially constant, subjecting liquid effluent from one centrifugating stage to retreatment in the next centrifugating stage, thereby effecting a removal from suspension of solids fractions of substantially uniform average particle size in each stage but of progressively increasing average fineness as the liquid effluent proceeds from one centrifugating stage to the next, and performing the first centrifugating under conditions to remove from suspension sand, mica, and other relatively coarse impurities and the last centrifugation under conditions to remove from suspension the finest solids fraction.

9. A method of resolving a liquid suspension of finely divided solids made up of particles of various sizes into separate substantially uniform solids fractions of different particle size involving treatment of the suspension in successive centrifuges or centrifugating stages, which comprises subjecting the suspension to a constant pressure head, introducing the suspension into a centrifuge, maintaining solids-depositing conditions, including the rate of rotation of the centrifuge and the rate of flow of suspension, substantially constant in the centrifuge, progressively removing during centrifugation the coarsest solids fraction from the centrifuge, separately discharging the finer solids in suspension from the centrifuge as liquid effluent and at a rate to maintain the effective centrifugating force in the centrifuge constant, subjecting the liquid effluent to a constant pressure head in the zone between a preceding and succeeding centrifugating stage, utilizing said constant head to introduce the liquid effluent to a succeeding centrifugating stage at a uniform rate of flow, and repeating the same steps in the succeeding centrifugating stage as in the preceding centrifugating stage in the same order under intensified solids-depositing conditions relative thereto, whereby removal from the suspension of substantially uniform solids fractions of progressively increasing fineness as the suspension proceeds from stage to stage may be effected.

SANFORD C. LYONS.